United States Patent [19]

Pease

[11] Patent Number: 5,177,344
[45] Date of Patent: Jan. 5, 1993

[54] METHOD AND APPPARATUS FOR ENHANCING A RANDOMLY VARYING SECURITY CHARACTERISTIC

[75] Inventor: Kevin J. Pease, Glenview, Ill.

[73] Assignee: Rand McNally & Company, Skokie, Ill.

[21] Appl. No.: 593,037

[22] Filed: Oct. 5, 1990

[51] Int. Cl.[5] .................... G06K 7/08; G06K 19/06
[52] U.S. Cl. .................................. 235/449; 235/450; 235/493; 380/3; 380/22
[58] Field of Search .............. 235/449, 450, 487, 493; 360/2, 134; 428/694, 900; 380/3, 22; 427/47, 48

[56] References Cited

U.S. PATENT DOCUMENTS

| | | | |
|---|---|---|---|
| 3,599,153 | 8/1971 | Lewis et al. | 340/149 |
| 3,636,318 | 1/1972 | Lindstrom et al. | 235/61.12 M |
| 3,788,617 | 1/1974 | Barney | 235/450 |
| 3,790,754 | 2/1974 | Black et al. | 235/61.7 B |
| 3,894,756 | 7/1975 | Ward | 283/7 |
| 3,959,630 | 5/1976 | Hogberg | 235/61.12 N |
| 4,034,211 | 7/1977 | Horst et al. | 235/61.12 N |
| 4,058,839 | 11/1977 | Darjany | 235/493 |
| 4,066,910 | 1/1978 | Swift | 250/555 |
| 4,092,526 | 5/1978 | Beck | 235/487 |
| 4,094,462 | 6/1978 | Moschner | 235/449 |
| 4,114,032 | 9/1978 | Brosow et al. | 235/493 |
| 4,180,837 | 12/1979 | Michaud | 235/493 |
| 4,215,812 | 8/1980 | Chancel | 235/493 |
| 4,218,674 | 8/1980 | Brosow et al. | 340/149 A |
| 4,303,949 | 12/1981 | Peronnet | 360/2 |
| 4,390,905 | 6/1983 | Tokitsu | 360/2 |
| 4,423,415 | 12/1983 | Goldman | 340/825.34 |
| 4,450,348 | 5/1984 | Stockburger et al. | 235/380 |
| 4,451,535 | 5/1984 | Pingaud et al. | 360/134 |
| 4,469,937 | 9/1984 | Stockburger et al. | 235/435 |
| 4,508,752 | 4/1985 | Takei et al. | 427/48 |
| 4,518,627 | 5/1985 | Foley et al. | 427/48 |
| 4,547,393 | 10/1985 | Asai et al. | 427/48 |
| 4,620,727 | 11/1986 | Stockburger et al. | 283/82 |
| 4,630,845 | 12/1986 | Sanner | 283/91 |
| 4,649,265 | 3/1987 | Stockburger et al. | 235/380 |
| 4,661,983 | 4/1987 | Knop | 382/1 |
| 4,806,740 | 2/1989 | Gold et al. | 235/493 |
| 4,837,426 | 6/1989 | Pease et al. | 235/493 |
| 4,861,619 | 8/1989 | Satake | 427/48 |
| 4,874,633 | 10/1989 | Komatsu et al. | 428/694 |
| 4,906,988 | 3/1990 | Copella | 235/449 |

FOREIGN PATENT DOCUMENTS

| | | |
|---|---|---|
| 2829778C2 | 8/1985 | Fed. Rep. of Germany . |
| 63-273272 | 11/1988 | Japan . |
| 529398 | 11/1972 | Switzerland . |
| 569333 | 11/1975 | Switzerland . |
| 1308331 | 2/1973 | United Kingdom . |
| 1331604 | 9/1973 | United Kingdom . |
| 1546053 | 1/1977 | United Kingdom . |
| 1535340 | 12/1978 | United Kingdom . |
| 1541579 | 3/1979 | United Kingdom . |

Primary Examiner—Eugene R. LaRoche
Assistant Examiner—Tan Nguyen
Attorney, Agent, or Firm—Dressler, Goldsmith, Shore, Sutker & Milnamow, Ltd.

[57] ABSTRACT

A randomly varying modulated current is generated and used to drive a magnetic write head in an apparatus for enhancing a randomly varying magnetic security characteristic of a medium. The write head can be positioned adjacent a fluid magnetic slurry for the purpose of altering the location of the various magnetic particles therein in a random fashion. The slurry can then be hardened thermally or using ultraviolet dryers. A circuit which can generate the randomly variable current for the read head includes a modulator which receives a first randomly variable signal and a second, different randomly varying signal which modulates the first signal.

13 Claims, 5 Drawing Sheets

METHOD AND APPPARATUS FOR ENHANCING A RANDOMLY VARYING SECURITY CHARACTERISTIC

FIELD OF THE INVENTION

The invention pertains to security systems useable to authenticate documents or other objects. More particularly, the invention pertains to an apparatus and a method for artificially enhancing an existing random characteristic of a medium for security purposes.

BACKGROUND OF THE INVENTION

Various types of security systems usable to authenticate documents or other objects are known. For example, U.S. Pat. No. 4,906,988 to Copella entitled "Object Verification System and Method", assigned to the assignee of the present invention and incorporated herein by reference, discloses a particular form of a security system which utilizes characteristics of spaced-apart magnetic regions. Previously issued U.S. Pat. No. 4,837,426 to Pease et al. entitled "Object Verification Apparatus and Method" describes a particular form of a magnetic security system which is usable with a continuously extending magnetic region.

Other systems are known which utilize a randomly varying translucency characteristic of paper and the like. Security systems are also possible where another randomly varying characteristic, such as print variations, of an object or a document are available for use.

Prior systems have often utilized the randomly varying characteristics as they existed in the document or the object. While such systems are useful, there are times when it would be desirable to physically enhance or exaggerate the random variation at the time when the randomly varying characteristic is created.

The above noted Pease et al. patent makes reference to enhancing random magnetic regions by underprinting or overprinting with magnetic ink in the vicinity of the magnetic security region. The same patent also refers to embossing, scratching or other methods of removable of a portion of the magnetic material to create a more readily detectable characteristic.

Beyond creating an exaggerated or an enhanced security region by physically altering a portion of the region, it would be desirable to be able to do so in such a way so as to make duplication or copying of the enhanced regions difficult or impossible. Further, it would be desirable to be able to create an enhanced structure using a method which does not appreciably add to the cost of producing what might otherwise be a very inexpensive document.

SUMMARY OF THE INVENTION

An apparatus for creating an enhanced random security characteristic in a region of a medium includes a signal modulator. A random electrical output from the modulator is coupled to an output device.

The output device can generate one of a plurality of different types of physical outputs depending on the medium to be enhanced.

If the medium is magnetic, the output device can be a magnetic write head. If the medium is optical, the output device can be a source of light energy such as a laser. If the medium is thermally sensitive, the output device can be a source of thermal energy.

The modulator can receive a randomly varying input signal to be modulated. The modulating signal can be a second randomly varying signal.

The result of using the present apparatus will be an enhanced, permanent, randomly varying characteristic in or on the region of the medium, to be used for security purposes. Because the region has been enhanced by means of one or more randomly varying signals, the process is very difficult if not impossible to emulate. Further, no two regions will be enhanced in the same way.

A method of enhancing includes the steps of:
providing a medium having a randomly varying characteristic;
generating a random condition; and
modifying the medium in response to the random condition to create an enhanced randomly varying characteristic.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENTS

Figure 1:
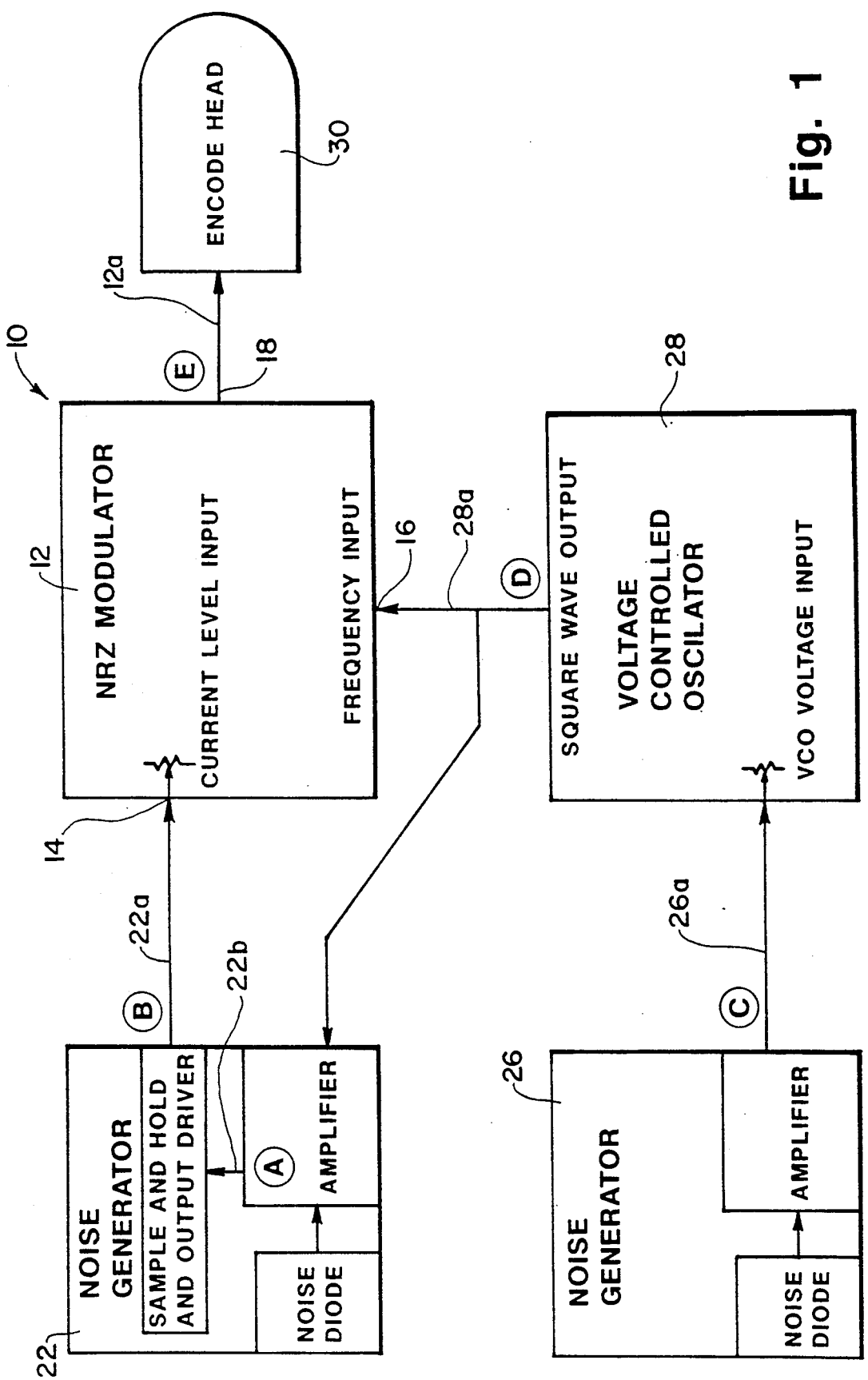
FIG. 1 is a block diagram schematic illustrating an electrical system for enhancing a magnetic security region in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiment illustrated.

FIG. 1 illustrates a block diagram schematic of an electrical system 10 usable to alter the distribution of magnetic particles in a fluid magnetic stripe. For example, magnetic stripes are often created on documents by depositing a slurry on a moving underlying medium. The medium can be a card stock or a plastic material from which individual documents can be created.

The slurry, until subsequently being hardened contains numerous, suspended, movable magnetic particles. When hardened, a permanent magnetic stripe with fixed magnetic characteristics is formed.

The electrical system 10 of FIG. 1 can be used to modify selected portions of the magnetic slurry before the slurry is hardened. As a result, the physical distribution of the magnetic particles in the slurry can be substantially altered, in a random fashion, using the system 10.

The system 10 includes an NRZ (non-return to zero) modulator 12. The modulator 12 has an input port 14 for an electrical signal to be modulated and an input port 16 for a modulating signal.

The modulator 12 also includes a modulated output port 18. A noise generator 22 which generates an approximation to white noise, for example, can be used to provide an electrical signal with a randomly varying amplitude. The randomly varying electrical output from the generator 22, on a line 22a can be coupled to the input port 14 of the modulator 12.

A second noise generator 26 can be used to create a randomly varying amplitude electrical signal on a line 26a. The electrical signal on the line 26a can be used as an input to a voltage controlled oscillator 28. Output from the voltage controlled oscillator on a line 28a varies in frequency in response to the amplitude of the randomly varying signal on line 26a.

Output from the voltage controlled oscillator 28 is coupled via the line 28a to the modulation input port 16 of the modulator 12. The line 28a is also coupled as an input to the first generator 22 so as to synchronize the signal variations on the line 22a with the frequency variations on the line 28a.

Output from the modulator at the port 18 is coupled to a magnetic write head 30 via a line 12a. Output from the magnetic write head 30, an electromagnetic field, can be used to displace the magnetic particles in an adjacent moving magnetic slurry.

Figure 2:
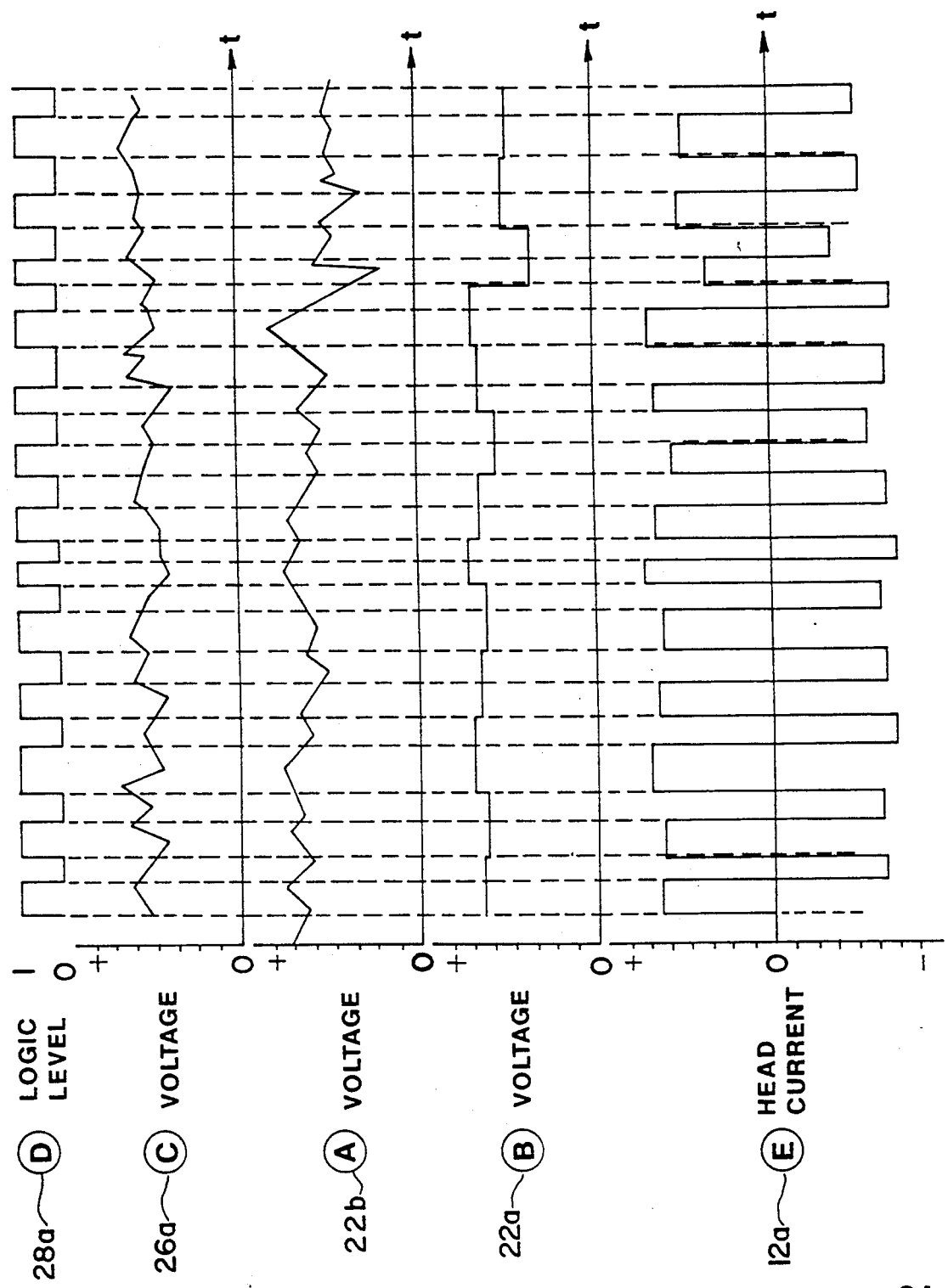
FIG. 2 is a graph illustrating plots of various electrical signals, from the block diagram of FIG. 1, as a function of time.

FIG. 2 is a graph illustrating various waveforms of the circuit of FIG. 1 as a function of time. The top most waveform, a constant amplitude signal of variable frequency corresponds to the output of the voltage control oscillator 28 on the line 28a. The second wave-form in the graph of FIG. 2 corresponds to a randomly varying amplitude signal generated by noise generator 26 which forms the input on the line 26a to the voltage control oscillator 28.

The third waveform in FIG. 2 represents a randomly varying amplitude electrical signal generated on a line 22b which is internal to the noise generator 22. The fourth electrical signal in the graph of FIG. 2 is the electrical signal on the line 22a with a randomly varying amplitude, based on the electrical signal on line 22b, synchronized in frequency with the output on the line 28a of the voltage controlled oscillator 28.

The bottom signal of the graph of FIG. 2 is a representation of the modulated output current on the line 12a from the modulator 12 which is the driving current for the write head 30. The electro-magnetic signals generated by the write head 30, responsive to the current on the line 12a, alter the spatial distribution, in a random fashion, of the magnetic particles in an adjacent magnetic slurry. This alteration results in an enhanced random magnetic security characteristic.

Figure 3A:
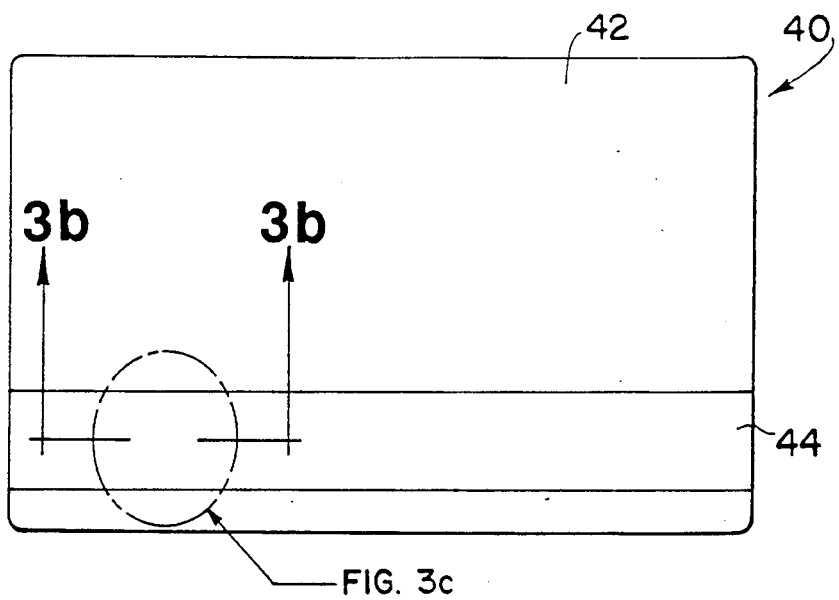
FIGS. 3A-3C illustrate schematically, in various views, a representation of an enhanced magnetic security region.
Figure 3B:
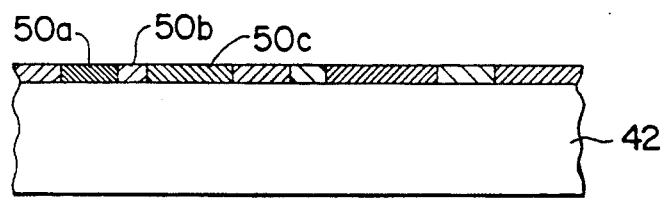
Figure 3C:
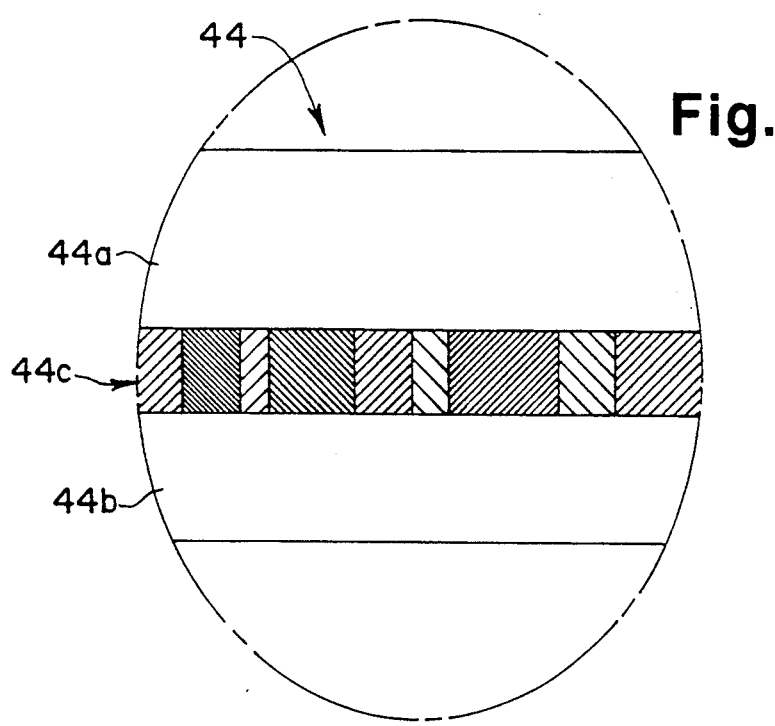

FIGS. 3A-3C represent diagrammatically the altered densities of the magnetic slurry which can be achieved using the system 10.

For example, with respect to FIG. 3A, a verifiable document or card 40 is formed with a support medium 42 which could be plastic or card stock. Carried on the medium 42 is a previously deposited and hardened magnetic stripe 44. Prior to hardening the magnetic stripe 44, the fluid slurry was subjected to electromagnetic fields generated by the system 10 using the write head 30.

FIG. 3B, an enlarged sectional view, illustrates variations in the density of the particles of the magnetic stripe 44 which have been created by means of the system 10. For example, region 50a represents pictorially a higher density concentration of magnetic particles than is present in an adjacent region of a different size of 50b.

Adjacent to the lower density region 50b is yet another region of a different density and length 50c. Thus, as illustrated in FIG. 3B, the magnetic stripe 40, in its hardened state, includes a plurality of spaced apart enhanced magnetic regions having differing magnetic characteristics and different sizes.

FIG. 3C is an enlargement of a portion of the magnetic stripe 44 as seen in a top elevational view. The enlarged detail illustrated in FIG. 3C corresponds to the sectional view of FIG. 3B.

The region 44 illustrated in FIG. 3C is formed with three distinct sections. Section 44a and section 44b represent regions of the magnetic slurry which prior to hardening were not subjected to sufficient strength of the electromagnetic field from the write head 30 of the system 10 to disturb the random distribution of the magnetic particles so as to create an enhanced random magnetic region.

The portion 44c, on the other hand, corresponding to the sectional view of FIG. 3B, represents the part of the magnetic stripe 44 which has been subjected to the enhancing electromagnetic field of the write head 30. The shadings and various colors illustrated in the region 44c are indicative of varying densities of magnetic particles present in the hardened stripe 44.

The region 44c thus represents a permanent, enhanced, randomly varying magnetic characteristic embedded within the magnetic stripe 44. This characteristic can be read and compared to a previously stored representation thereof as disclosed and taught in the previously issued Pease et al. and Copella patents.

Figure 4A:
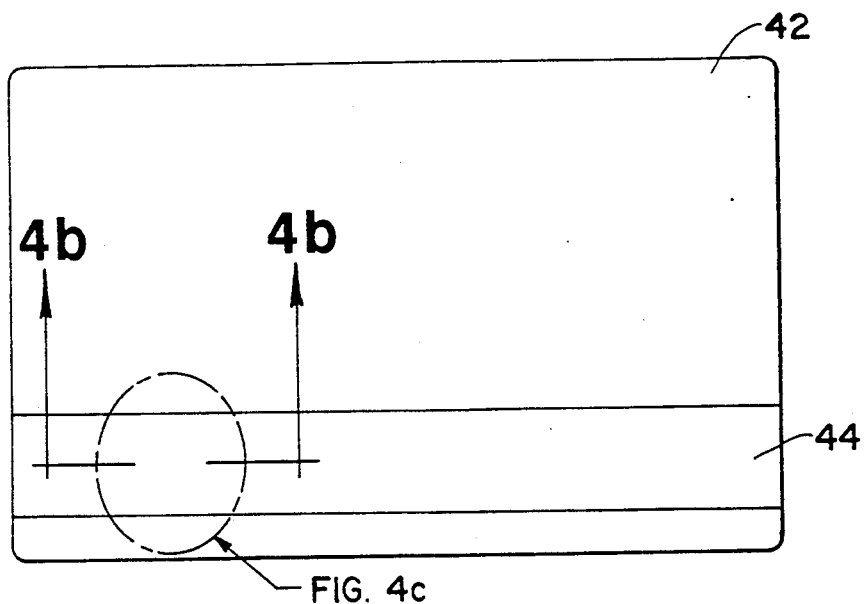
FIGS. 4A-4C illustrate schematically, in various views, an alternate enhanced magnetic security region.
Figure 4B:
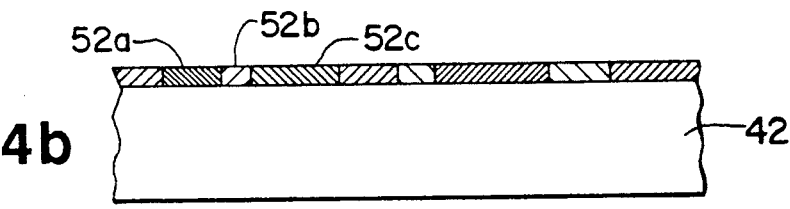
Figure 4C:
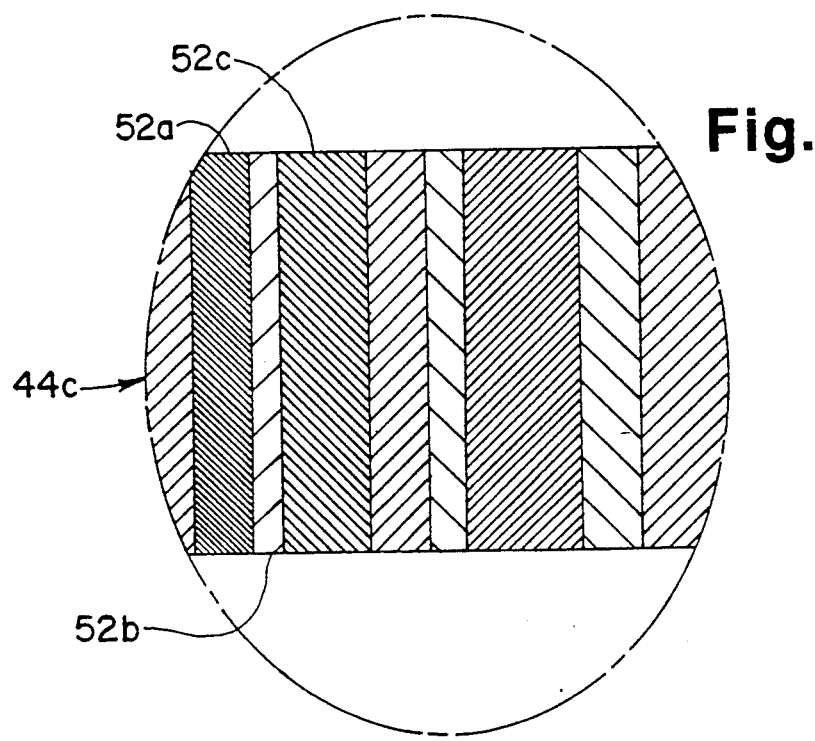

FIGS. 4A-4C illustrate the verifiable document 42 with a different, enhanced, random characteristic. The magnetic stripe 44 has been modified across its entire width by a system such as the system 10. As illustrated in FIG. 4C, the portion 44c which includes the enhanced randomly varying magnetic characteristic extends for the entire width of the stripe 44.

Figure 5:
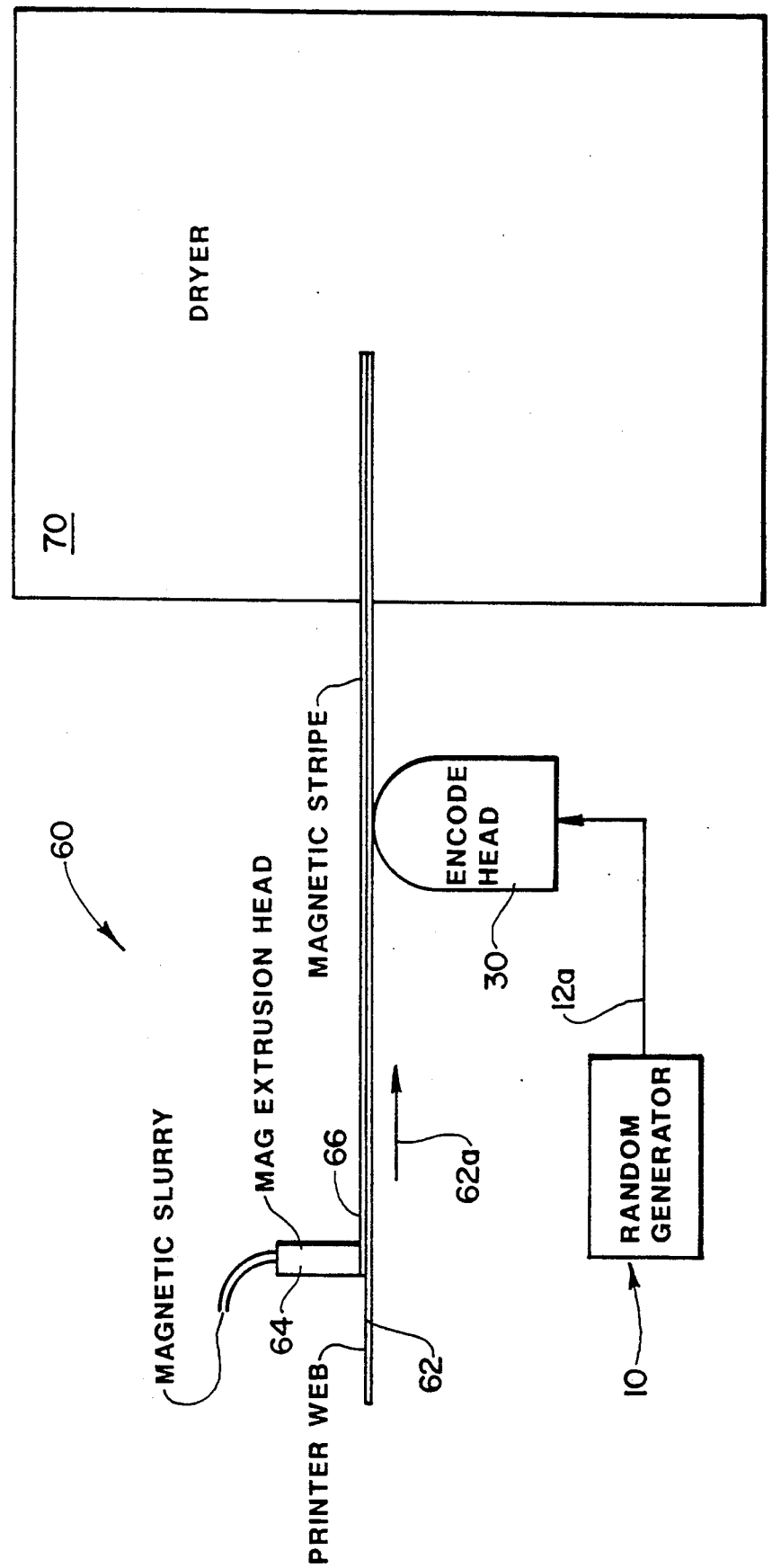
FIG. 5 is an overall schematic diagram of a system for enhancing the random magnetic characteristic of a magnetic security region in accordance with the present invention.

FIG. 5 illustrates a system 60 which incorporates the system 10 coupled to the read head 30 in conjunction with a slurry extruding device. As illustrate in FIG. 5, the system 60 includes a medium 62 movable perhaps by rollers or the like past a magnetic stripe extrusion head 64. As the medium 62 moves in a direction 62a under the extrusion head 64, a magnetic stripe 66 is extruded in a fluid condition.

As the medium 62 continues to move in the direction 62a, the deposited stripe 66 moves past the adjacent write head 30 which is being driven by the system 10. As the stripe 66 moves past the write head 30, the magnetic particles therein are displaced as indicated schematically in FIGS. 3c and 4c, depending on the width of the electromagnetic field and the strength thereof relative to the width of the stripe 66. Subsequently, the enhanced magnetic slurry, still in a liquid state, passes through a dryer 66 which hardens the slurry and freezes the displaced magnetic particles permanently in place.

When the medium with the hardened magnetic stripe 66 exits the dryer 70, the medium can be cut to form discrete cards or documents such as the document 42. As a result of cutting and shaping the document 42, the portion of the magnetic stripe 44 carried on the document will also carry with it the permanently enhanced magnetic region that is illustrated by the region 44c.

While the present method and apparatus have been disclosed and described in terms of a magnetically based security system, it will be understood that the characteristics of the particular enhanceable medium are not a limitation of the present invention. For example, alternately, instead of a magnetic medium, an optical medium can be used. Instead of a write head, such as the write head 30, a modulatable light or laser can be used to expose regions of the optical medium.

A modulated laser can be used as an output device for removing or burning off portions of the medium whose characteristic is to be enhanced. Similarly, a modulatable thermal element can be used to heat portions of a security medium which are heat sensitive thereby producing a thermally induced variation in a randomly varying security characteristic. All of the above method of enhancing a random security characteristic can be used alone or in combination with other security techniques.

It will be understood that other variations of randomly variable security characteristic, when modified as disclosed herein, come within the scope and bounds of the present invention.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. An apparatus for creating an enhanced random magnetic characteristic in a fluid magnetic region carried on an underlying medium, the apparatus comprising:
    a signal modulator with a modulatable signal input, a modulation signal input and a modulated signal output;
    a source of substantially random electrical signals coupled to said modulatable signal input;
    a source of substantially random modulating signals coupled to said modulation input:
    a magnetic write head coupled to said modulated signal output and located adjacent to the fluid magnetic region for altering the magnetic characteristics thereof.

2. An apparatus as in claim 1 with said source of random signals including circuitry for generating an electrical signal having white noise-like frequency characteristics at least for a predetermined frequency range.

3. An apparatus as in claim with said modulator including circuitry for altering a frequency parameter of said substantially random, electrical signals.

4. An apparatus as in claim 1 with said source of modulating signals including a voltage controlled oscillator.

5. A method of generating an enhanced random, magnetic characteristic in a magnetic slurry supported on an underlying medium comprising:
    providing a magnetic slurry;
    generating a first electrical signal having a random-like characteristic;
    generating a second electrical signal having a different random-like characteristic;
    modulating the first signal with the second signal and, in response thereto, producing a third signal; and
    altering the magnetic characteristics of the slurry with the third signal.

6. A method as in claim 5 including hardening the slurry after its magnetic characteristics have been altered.

7. A method as in claim 5 including drying the slurry after its magnetic characteristics have been altered.

8. A method as in claim 5 with said second electrical signal generated with a randomly varying frequency.

9. A method as in claim 5 with said first electrical signal generated with a randomly varying amplitude.

10. A method as in claim 5 including in the altering step generating an electro-magnetic field responsive to the third signal, moving the slurry and applying the electro-magnetic field to the moving slurry.

11. A method as in claim 5 including applying radiant energy to the magnetic slurry to harden same.

12. A method of generating an enhanced random, security characteristic in a slurry magnetic medium comprising:
    providing an enhanceable slurry magnetic medium;
    generating a first electrical signal having a random-like characteristic;
    generating a modulating signal;
    synchronizing the electrical signal with the modulating signal;
    modulating the synchronized electric signal; and
    altering the random characteristics of the slurry magnetic medium with the synchronized and modulated electrical signal and then hardening the medium.

13. An apparatus for creating an enhanced random characteristic in a slurry magnetic medium prior to hardening that medium, the apparatus comprising:
    a signal modulator with a signal input port, a modulation input port, and a modulated signal output port;
    a source of substantially random electrical signals coupled to said modulator signal input port;
    circuitry, coupled to said modulation input port and to said source, for synchronizing an electrical signal from said source with an input to said modulation input port; and
    an output device coupled to said modulated signal output port and located adjacent to the slurry magnetic medium for altering the random characteristics thereof in response to said modulated signal output while the medium is still a slurry.

* * * * *